(12) United States Patent
Deng et al.

(10) Patent No.: US 9,530,413 B2
(45) Date of Patent: Dec. 27, 2016

(54) SOCKET AND VOICE-RECOGNITION METHOD USING SAME

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Jun-Yi Deng, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/611,795

(22) Filed: Feb. 2, 2015

(65) Prior Publication Data
US 2016/0203816 A1  Jul. 14, 2016

(30) Foreign Application Priority Data
Jan. 8, 2015 (CN) .......................... 2015 1 0008657

(51) Int. Cl.
*G10L 21/00* (2013.01)
*G10L 15/22* (2006.01)

(52) U.S. Cl.
CPC .......... *G10L 15/22* (2013.01); *G10L 2015/223* (2013.01)

(58) Field of Classification Search
CPC ........... G10L 15/20; G10L 2021/02166; G10L 21/0208; A63F 13/06; A63F 2300/1081
USPC ....... 340/990, 995.2; 369/86, 47.1; 370/278, 370/286, 296; 379/388.06; 701/93, 300, 701/246, 443; 704/270, 275, E21.004, 704/231, 272, E15.045; 345/168
See application file for complete search history.

(56) References Cited

U.S. PATENT DOCUMENTS 5,592,385 A * 1/1997 Katayama .............. B60K 31/00
                                                        701/300

* cited by examiner

*Primary Examiner* — Charlotte M Baker
(74) *Attorney, Agent, or Firm* — Zhigang Ma

(57) ABSTRACT

A socket includes a voice-receiver, a processing module coupled to the voice-receiver, a converting member coupled to the processing module, and a switching member coupled to the converting member. The switching member is configured to couple to a supply member and a load. The voice-receiver is configured to receive a voice instruction. The processing module is configured to recognize the voice instruction and to output a control signal according the voice instruction. The converting member is configured to convert the control signal to a switching signal. The switching member is configured to be switched on or be switched off according to the switching signal. The supply member is configured to supply power to the load after the switching member is be switched on and not to supply power to the load after the switching member is be switched off. A voice-recognition method is also provided.

18 Claims, 3 Drawing Sheets

SOCKET AND VOICE-RECOGNITION METHOD USING SAME

CROSS-REFERENCE TO RELATED APPLICATIONS

This application claims priority to Chinese Patent Application No. 201510008657.7 filed on Jan. 8, 2015, the contents of which are incorporated by reference herein.

FIELD

The subject matter herein generally relates to a socket.

BACKGROUND

A socket may be controlled by voice-recognition.

BRIEF DESCRIPTION OF THE DRAWINGS

Implementations of the present technology will now be described, by way of example only, with reference to the attached figures.

DETAILED DESCRIPTION

Figure 1:
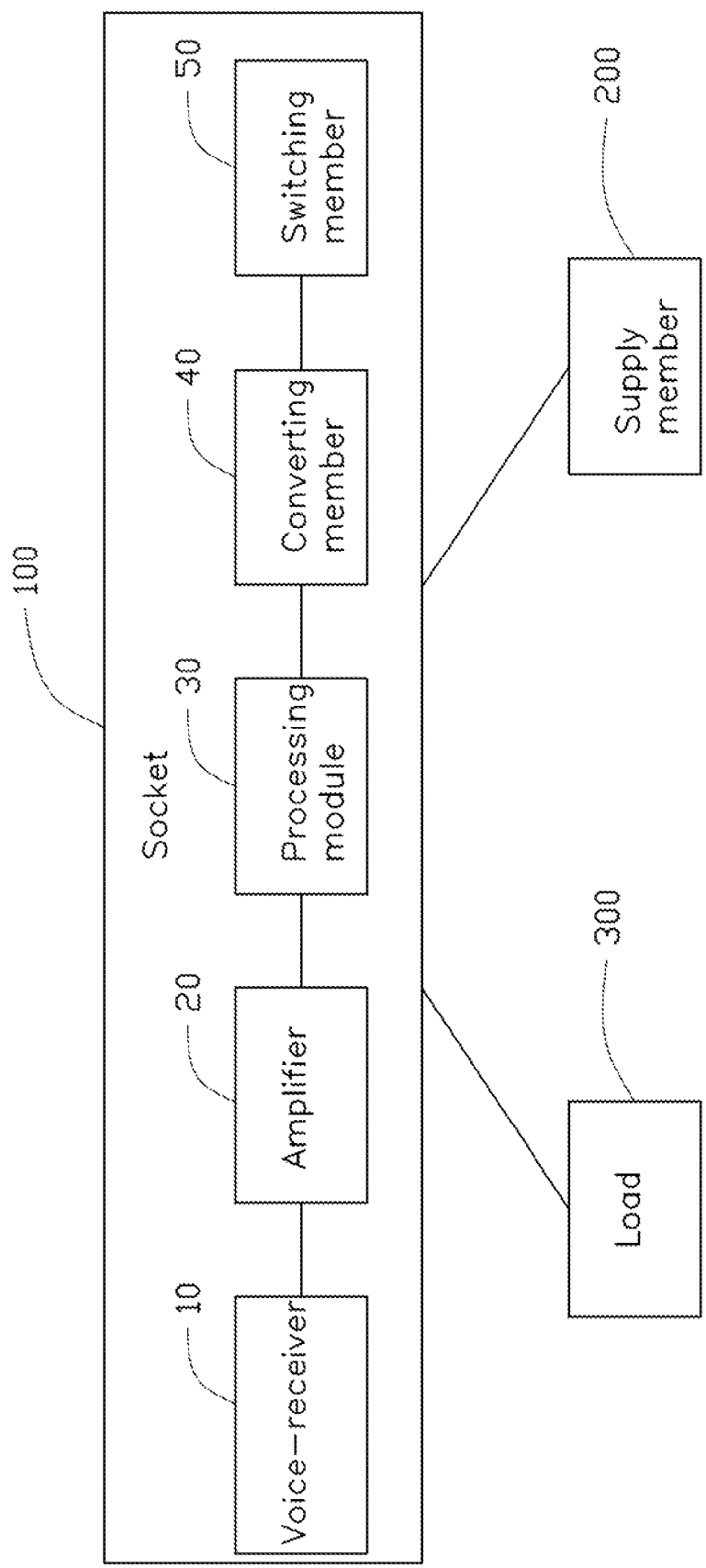
FIG. 1 is a block diagram of one embodiment of a socket, a supply member, and a load.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The present disclosure is described in relation to a socket controlled by voice-recognition.

FIG. 1 illustrates an embodiment of a socket 100. The socket 100 comprises a voice-receiver 10, an amplifier 20, a processing module 30, a converting member 40, and a switching member 50. The socket 100 is coupled to a supply member 200 and coupled to a load 300. In one embodiment, the voice-receiver member 10 is a microphone, the processing module 30 is a register, the converting member 40 is an analog-to-digital converter and the switching member 50 is a relay.

The voice-receiver 10 is configured to receive a voice instruction. The amplifier 20 is configured to amplify the voice instruction. The processing module 30 is configured to convert the amplified voice instruction to a control signal. The converting member 40 is configured to convert the control signal to a switching signal. The switching signal comprises a triggered signal and a stop signal. The switching member 50 is configured to be switched on or switched off after receiving the switching signal. The supply member 200 is configured to supply power to the load 300 after the switching member 50 is switched on. The supply member 200 is configured to not supply power to the load 300 after the switching member 50 is switched off. In one embodiment, a user can give a voice instruction, the processing module 30 is configured to output one corresponding control signal after recognizing the voice instruction from the user, the converting member 40 is configured to convert the corresponding control signal to one corresponding triggered signal or one corresponding stop signal, and the switching member 50 is configured to be switched on according to the triggered signal and be switched off according to the stop signal.

Figure 2:
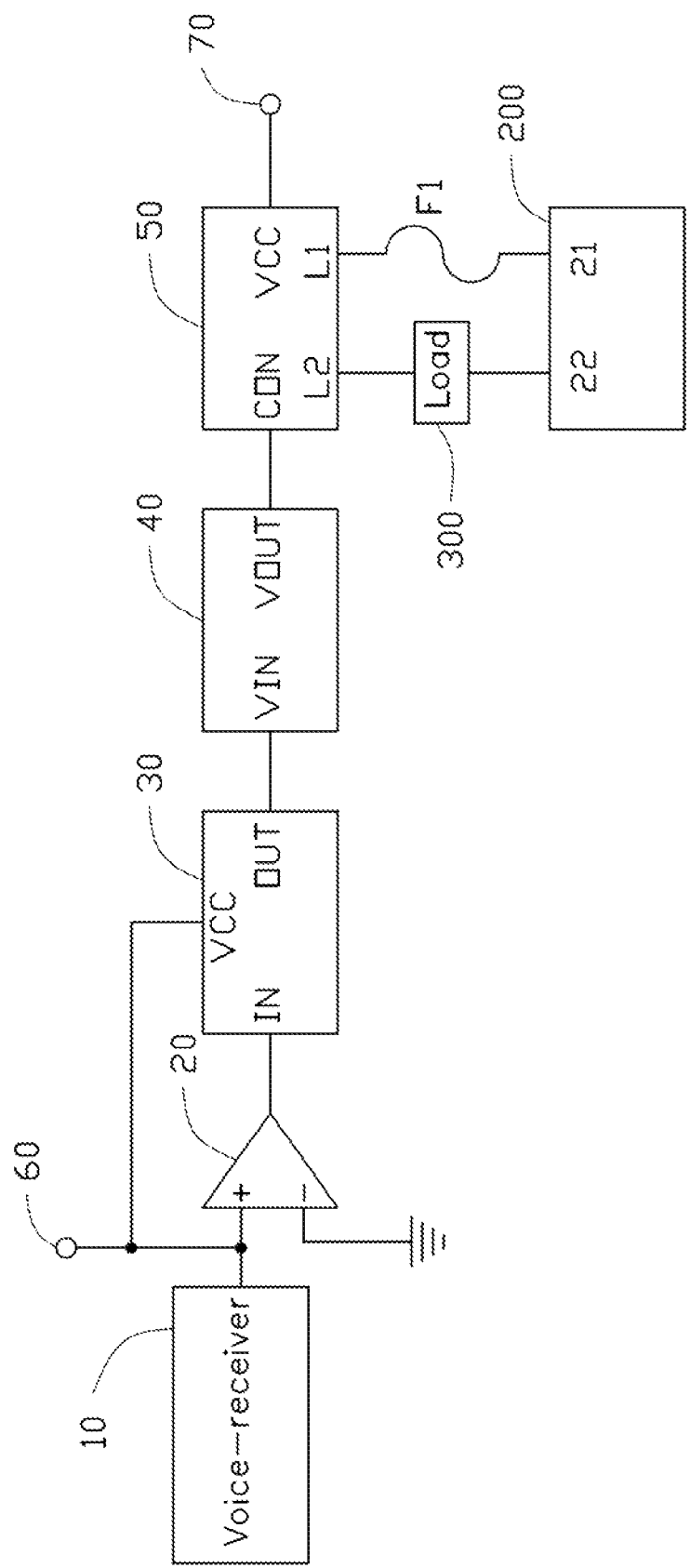
FIG. 2 is a circuit diagram of the socket, the supply member, and the load of FIG. 1.

FIG. 2 illustrates that the supply member 200 is an alternating power supply and comprises a fire line terminal 21 and a zero terminal 22. The processing module 30 comprises an input terminal IN, an output terminal OUT, and a power supply terminal VCC.

The switching member 50 comprises a receiving terminal CON, a first connecting coupled to terminal L1, a second connecting terminal L2, and a power supply terminal VCC.

The converting member 40 comprises an input pin VIN and an output pin VOUT.

The voice-receiver 10 is coupled to a positive input terminal of the amplifier 20. The positive input terminal of the amplifier 20 is coupled to a first power supply 60. A reverse input terminal of the amplifier 20 is grounded. An output terminal of the amplifier 20 is coupled to the input terminal IN of the processing module 30. The power supply terminal VCC of the processing module 30 is coupled to the first power supply 60. The output terminal of the processing module 30 is coupled to the input pin VIN of the converting member 40. The output pin VOUT of the converting member 40 is coupled to the receiving terminal CON of the switching member 50. The first connecting terminal L1 of the switching member 50 is coupled to the fire line terminal 21 of the supply member 200 via a fuse F1. The second connecting terminal L2 of the switching member 50 is coupled to the zero terminal 22 of the supply member 200 via the load 300. The power supply terminal VCC of the switching member 50 is coupled to a second power supply 70.

In one embodiment, the first power supply 60 is configured to provide a 3.3V voltage and the second power supply 70 is configured to provide a 12V voltage.

Figure 3:
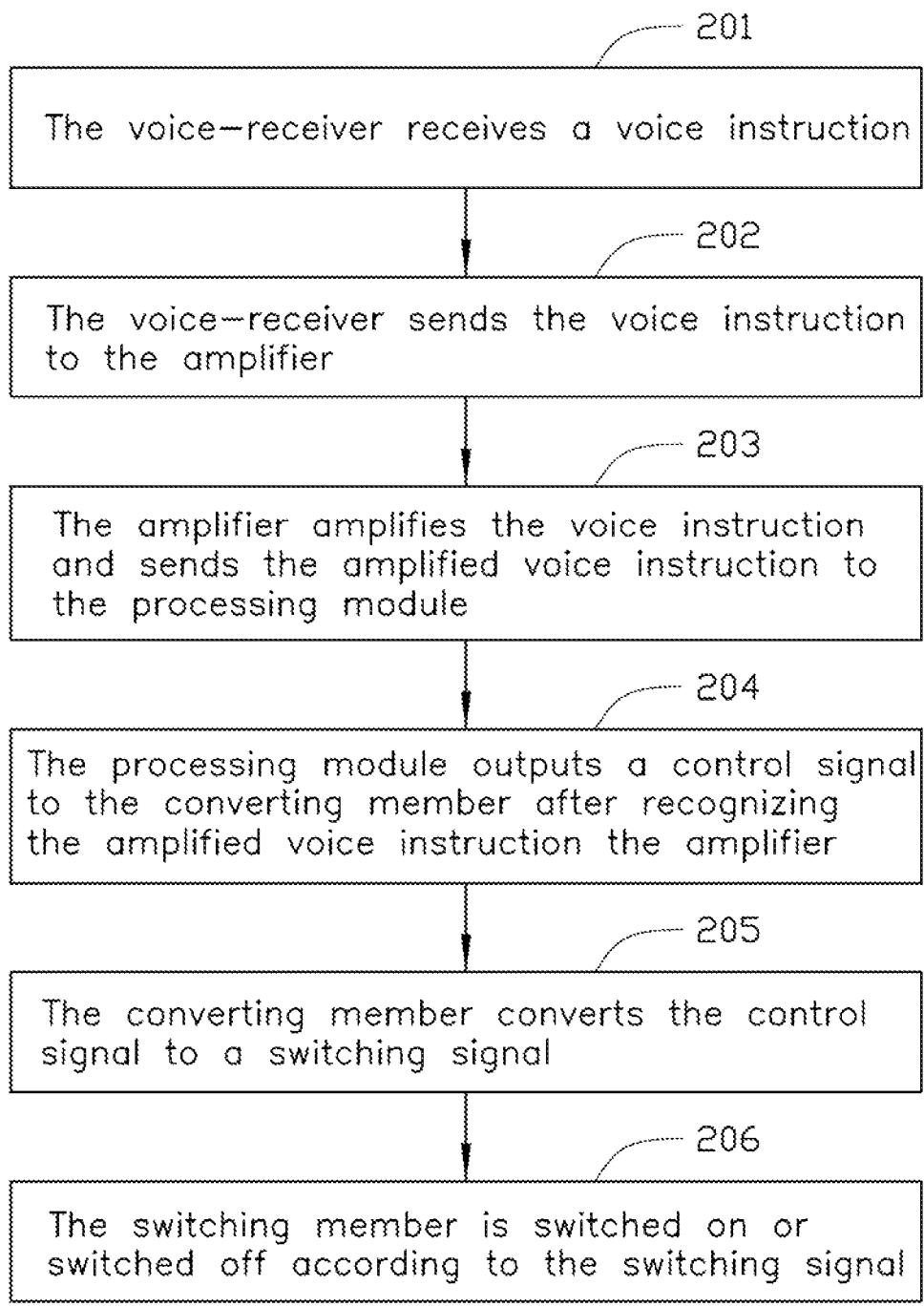
FIG. 3 is a flow chart of one embodiment of a voice-recognition method.

FIG. 3 illustrates a flowchart in accordance with an example embodiment. A voice-recognition method is provided by way of example, as there are a variety of ways to carry out the method. The voice-recognition method described below can be carried out using the configurations illustrated in FIGS. 1 and 2, for example, and various elements of these figures are referenced in explaining voice-recognition method. Each block shown in FIG. 3 represents one or more processes, methods, or subroutines carried out in the voice-recognition method. Additionally, the illustrated order of blocks is by example only and the order of the blocks can change. The voice-recognition method can begin at block 201.

In block 201, the voice-receiver 10 receives a voice instruction.

In block 202, the voice-receiver 10 sends the voice instruction to the amplifier 20.

In block 203, the amplifier 20 amplifies the voice instruction and sends the amplified voice instruction to the processing module 30.

In block 204, the processing module 30 outputs a control signal to the converting member 40 after recognizing the amplified voice instruction from the amplifier 20.

In block 205, the converting member 40 converts the control signal to a switching signal.

In block 206, the switching member 50 is switched on or switched off according to the switching signal.

In the embodiment, when a user controls the socket 100 via a voice instruction, the voice-receiver 10 sends the voice instruction to the amplifier 20 after receiving the voice instruction from the user. The amplifier 20 amplifies the voice instruction after receiving the voice instruction from the voice-receiver 10 and sends the voice instruction to the processing module 30. The processing module 30 outputs the corresponding control signal to the converting member 40 after recognizing the amplified voice instruction from the amplifier 20. The converting member 40 converts the control signal to the corresponding switching signal. The switching member 50 is switched on or switched off according to the switching signal. The socket 100 supplies power to the load 300 after the switching member 50 is switched on. The socket 100 does not supply power to the load 300 after the switching member 50 is switched off.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. A socket comprising:
a voice-receiver configured to receive a voice instruction;
an amplifier configured to amplify the voice instruction received from the voice-receiver;
a processing module configured to recognize the amplified voice instruction after receiving the amplified voice instruction and to output a control signal after recognizing the amplified voice instruction;
a converting member configured to convert the control signal to a switching signal after receiving the control signal, and
a switching member configured to be switched on or be switched off according to the switching signal;
wherein the processing module comprises an input terminal and an output terminal, the output terminal of the amplifier is coupled to the input terminal of the processing module and the output terminal of the processing module is coupled to the converting member;
wherein the switching member is configured to couple to a supply member and a load;
wherein the supply member is configured to supply power to the load when the switching member is switched on, and
wherein the supply member is further configured to not supply power to the load when the switching member is switched off.

2. The socket of claim 1, wherein the converting member is an analog-to-digital converter.

3. The socket of claim 1, wherein the voice-receiver is a microphone.

4. The socket of claim 1, wherein the switching member comprises an input terminal and a receiving terminal, the output terminal of the processing module is coupled to the input pin of the converting member, and the output pin of the converting member is coupled to the receiving terminal of the switching member.

5. The socket of claim 4, wherein the switching member further comprises a first connecting terminal and a second connecting terminal coupled to terminal, the first connecting terminal of the switching member is coupled to one end of the load, the other end of the load is coupled to one end of the supply member, the other end of the supply member is coupled to the second connecting terminal of the switching member.

6. The socket of claim 5, wherein the supply member comprises a fire line terminal and a zero terminal, the second connecting terminal of the switching member is coupled to one end of a fuse, the other end of the fuse is coupled to the fire line terminal of the supply member, and the load is coupled between the first connecting terminal of the switching member and the zero terminal of the supply member.

7. The socket of claim 1, wherein the processing module is a register.

8. The socket of claim 1, wherein the switching member is a relay.

9. A voice-recognition method comprising:
receiving a voice instruction by a voice-receiver;
recognizing the voice instruction by a processing module;
outputting a control signal after recognizing the voice instruction by a processing module;
converting the control signal to a trigger signal or a stop signal by a converting member, and
switching on by a switching member according to the trigger signal or switching off by the switching member according to the stop signal.

10. The voice-recognition method of claim 9, further comprising a step of amplifying the voice instruction by an amplifier before the processing module recognizing the voice instruction.

11. A socket comprising:
a voice-receiver configured to receive a voice instruction;
a processing module coupled to the voice-receiver member;
a converting member coupled to the processing module, and
a switching member coupled to the converting member;
wherein the switching member is configured to couple to a supply member and a load;
wherein the processing module is configured to recognize the voice instruction after receiving the voice instruction;
wherein the processing module is further configured to output a control signal after recognizing the voice instruction;
wherein the converting member is configured to convert the control signal to a switching signal after receiving the control signal from the processing module;
wherein the switching signal comprises a triggered signal and a stop signal;

wherein the switching member is configured to be switched on after receiving the triggered signal;

wherein the switching member is further configured to be switched off after receiving the stop signal;

wherein the supply member is configured to supply power to the load when the switching member is switched on, and wherein the supply member is further configured to not supply power to the load when the switching member is switched off.

12. The socket of claim 11, further comprises an amplifier, wherein the amplifier is configured to amplify the voice instruction from the voice-receiver, and the processing module is configured to recognize the amplified voice instruction from the amplifier.

13. The socket of claim 12, wherein the processing module comprises an input terminal and an output terminal, the output terminal of the amplifier is coupled to the input terminal of the processing module, and the output terminal of the processing module is coupled to the converting member.

14. The socket of claim 13, wherein the switching member comprises an input terminal and a receiving terminal, the output terminal of the processing module is coupled to the input pin of the converting member, and the output pin of the converting member is coupled to the receiving terminal of the switching member.

15. The socket of claim 14, wherein the switching member further comprises a first connecting terminal and a second connecting terminal, the first connecting terminal of the switching member is coupled to one end of the load, the other end of the load is coupled to one end of the supply member, the other end of the supply member is coupled to the second connecting terminal of the switching member.

16. The socket of claim 15, wherein the supply member comprises a fire line terminal and a zero terminal, the second connecting terminal of the switching member is coupled to one end of a fuse, the other end of the fuse is coupled to the fire line terminal of the supply member, and the load is coupled between the first connecting terminal of the switching member and the zero terminal of the supply member.

17. The socket of claim 11, wherein the switching member is a relay.

18. The socket of claim 11, wherein the voice-receiver member is a microphone.

* * * * *